United States Patent
Kobayashi

(10) Patent No.: US 8,462,787 B2
(45) Date of Patent: Jun. 11, 2013

(54) METHOD FOR MANAGING MAC ADDRESS FOR OPEN NETWORK ADAPTOR

(75) Inventor: Hiroki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 160 days.

(21) Appl. No.: 13/040,554

(22) Filed: Mar. 4, 2011

(65) Prior Publication Data

US 2011/0188502 A1 Aug. 4, 2011

Related U.S. Application Data

(63) Continuation of application No. PCT/JP2008/066093, filed on Sep. 5, 2008.

(51) Int. Cl.
H04L 12/28 (2006.01)

(52) U.S. Cl.
USPC ... 370/392; 370/390; 370/395.3; 370/395.31; 370/400; 370/410

(58) Field of Classification Search
USPC ............... 370/390, 392, 395.3, 395.31, 400, 370/401, 410
See application file for complete search history.

(56) References Cited

U.S. PATENT DOCUMENTS

| | | | | |
|---|---|---|---|---|
| 5,517,648 A | * | 5/1996 | Bertone et al. ................ | 710/244 |
| 5,659,680 A | * | 8/1997 | Cunningham et al. .......... | 714/25 |
| 5,659,798 A | * | 8/1997 | Blumrich et al. ............... | 710/26 |
| 5,724,553 A | * | 3/1998 | Shigeeda ...................... | 711/170 |
| 5,802,555 A | * | 9/1998 | Shigeeda ...................... | 711/106 |
| 5,809,340 A | * | 9/1998 | Bertone et al. .................. | 710/58 |
| 6,047,355 A | * | 4/2000 | Wu et al. ....................... | 711/119 |
| 6,058,446 A | | 5/2000 | Ichimi et al. | |
| 6,205,527 B1 | * | 3/2001 | Goshey et al. ................ | 711/162 |
| 6,247,063 B1 | | 6/2001 | Ichimi et al. | |
| 6,477,629 B1 | * | 11/2002 | Goshey et al. ................ | 711/162 |
| 7,856,487 B2 | * | 12/2010 | Kalis ............................. | 709/220 |
| 2004/0111535 A1 | * | 6/2004 | Boucher et al. .............. | 709/250 |

(Continued)

FOREIGN PATENT DOCUMENTS

| | | |
|---|---|---|
| JP | 8-235084 | 9/1996 |
| JP | 8-235084 A | 9/1996 |

(Continued)

OTHER PUBLICATIONS

English Translation of the International Preliminary Report on Patentability mailed Apr. 21, 2011 in corresponding international Patent Application PCT/JP2008/066093.

(Continued)

Primary Examiner — Andrew Lai
Assistant Examiner — Andrew C Lee
(74) Attorney, Agent, or Firm — Staas & Halsey LLP

(57) ABSTRACT

A MAC address management method for use in a computer system having a disk device to store a MAC address and assigns the MAC address to an open network adaptor (ONA) printed board, which has a memory retaining a MAC address and an open network adaptor, mounted into the computer system. The METHOD includes: reading, when an ONA printed board is mounted into the computer system for the first time, the MAC address from the memory on the ONA printed board and storing the MAC address in the disk device and invalidating the MAC address; and validating, if a migration instruction is inputted, the MAC address stored in the memory of the ONA printed board mounted in the computer system.

6 Claims, 19 Drawing Sheets

U.S. PATENT DOCUMENTS

| | | | |
|---|---|---|---|
| 2005/0193182 A1* | 9/2005 | Anderson et al. | 711/163 |
| 2006/0208066 A1* | 9/2006 | Finn et al. | 235/380 |
| 2009/0024714 A1* | 1/2009 | Raisch et al. | 709/212 |
| 2009/0059933 A1* | 3/2009 | Huang et al. | 370/401 |
| 2009/0132760 A1* | 5/2009 | Flynn et al. | 711/113 |
| 2011/0047356 A2* | 2/2011 | Flynn et al. | 712/220 |

FOREIGN PATENT DOCUMENTS

| | | |
|---|---|---|
| JP | 10-65702 | 3/1998 |
| JP | 10-065702 A | 3/1998 |
| JP | 10-336208 | 12/1998 |
| JP | 10-336208 A | 12/1998 |
| JP | 2004-13327 | 1/2004 |
| JP | 2004-013327 A | 1/2004 |
| JP | 2005-51527 | 2/2005 |
| JP | 2005-051527 A | 2/2005 |
| JP | 2007-20050 | 1/2007 |
| JP | 2007-020050 A | 1/2007 |

OTHER PUBLICATIONS

International Search Report, mailed Nov. 18, 2008, in corresponding International Application No. PCT/JP2008/066093 (2 pp.).

* cited by examiner

METHOD FOR MANAGING MAC ADDRESS FOR OPEN NETWORK ADAPTOR

CROSS-REFERENCE TO RELATED APPLICATIONS

This is a continuation of Application PCT/JP2008/066093, filed on Sep. 5, 2008, now pending, the entire contents of which are herein wholly incorporated by reference.

FIELD

The present invention relates to management of a MAC address used for transmitting and receiving data.

BACKGROUND

An ONA (Open Network Adaptor) printed board is an extension board inserted into a channel slot within a housing of a server, the ONA mounted thereon, which is defined as a LAN adaptor for establishing a connection with Ethernet (the registered trademark of Fuji Xerox Co. Ltd.), is connected to a plurality of terminals via the network and supports open network protocols such as TCP/IP, OSI and FNA (Fujitsu Network Architecture). Note that the server housing is mounted with, in addition, a service processor (SVP) as a dedicated processor which manages setting information and performs initial diagnosis of the server and monitors an operation status ranging from switching ON a power source to switching OFF the power source.

The ONA described above generates a MAC frame by attaching information such as a destination MAC address and a MAC address of the ONA itself to the communication data received from the server and broadcasts the thus-generated MAC frame to the network. Moreover, the ONA extracts the data from the MAC frame of which the destination MAC address is coincident with the self MAC address among the MAC frames received from the respective terminals via the network, and hands over the extracted data to the server. Therefore, a unique MAC address is allocated to each ONA printed board when shipped from a factory and is written to a memory (EEPROM) on the ONA printed board.

A scheme of the ONA printed board used for the server is, however, not that the MAC address written to the EEPROM is read in an intact status and used for transmitting and receiving the data but that the SVP reads the MAC address from the EEPROM of the ONA printed board mounted for the first time into the housing of the server and stores the MAC address in a hard disk, and the MAC address is hereafter copied to an SDRAM on the ONA printed board mounted in the housing of the server and used for the ONA of the ONA printed board to transmit and receive the data.

The reason why such MAC address management is carried out is derived from the following. Namely, the terminal using the MAC address for the communications with the ONA in the server includes an ARP table for ARP (Address Resolution Protocol) and is required to set the MAC address of the ONA and an IP address of the server in the way of being associated with each other. Accordingly, if the MAC address written to the EEPROM of the ONA printed board is used in an intact status similarly to the management in a small-scale computer using a general type of LAN card, the MAC address in the ARP table of the individual terminal must be reset each time the ONA printed board is replaced from within the housing of the server. Restraint of a downtime of the ONA down to the minimum when a fault occurs in, e.g., the ONA printed board, however, entails replacing the whole ONA printed board, and, while on the other hand, since the terminals performing the communications with the server tremendously rise in number, it is desirable for reducing a time-consuming operation for maintenance of the whole system that the resetting of the MAC address on the terminal is made unnecessary. Therefore, the operation of copying the MAC address stored in the hard disk of the SVP described above to the SDRAM on the ONA printed board and thus using the MAC address, is adopted.

An in-depth description of the operation of the MAC address described above will hereinafter be made with reference to FIGS. 20 through 23.

To start with, in a flowchart of FIG. 20 illustrating an operation flow when newly mounting, a person in charge of maintenance (customer engineer) begins a mounting work (S501) and mount the ONA printed board into the housing of the server. Then, a CPU on the ONA printed board detects that the ONA printed board is mounted in a housing A (S521), whereby the SVP starts the mount process (S511). And the SVP reads the MAC address (MAC address A), which is unique to the ONA printed board, from the EEPROM of the ONA printed board (S512), and stores the MAC address in the hard disk (S513). On the other hand, the CPU on the ONA printed board sets the flag of the EEPROM to "invalid", thereby invalidating the MAC address A (S522). With the processes described above, the mount process by the ONA printed board and the mount process of the SVP are completed.

Subsequently, the customer engineer sets the MAC address A in the ARP table of each of the terminals performing the communications with the server.

Hereafter, when a user of the server switches ON a main power source, an initial setting process is executed, and the MAC address A stored in the hard disk of the SVP is copied to the SDRAM of the ONA printed board and used for the ONA to transmit and receive the data.

Next, when the customer engineer inputs the exchange instruction to the SVP from on the console, the SVP starts the exchange process (S621) and enables the ONA printed board (old ONA) to be demounted (S622). Then, the customer engineer demounts the old ONA from the housing A. Subsequently, the customer engineer mounts the ONA printed board (new ONA) of which a MAC address B is written in the EEPROM (FIG. 21). Thereupon, the CPU of the ONA printed board with the new ONA detects that the ONA printed board (ONA) is mounted into the housing A (S631) and, after notifying the SVP that the new ONA is mounted (S632), sets the flag of the EEPROM to "invalid", thereby invalidating the MAC address B (S633, FIG. 22). On the other hand, the SVP receiving the notification notifies, through the console, the customer engineer of the completion of mounting the new ONA (S623). With the processes described above, the mount process by the ONA printed board and the exchange process of the SVP are completed.

Through the processes described above, the MAC address A stored in the hard disk of the SVP is not changed. Further, the MAC address A set in the ARP table of each terminal is not changed. Hence, hereafter, when the user of the server switches ON the main power source, the initial setting process is executed, and the MAC address A stored in the hard disk of the SVP is copied to the SDRAM of the ONA printed board and used for the ONA to transmit and the receive the data.

Note that, if the flag on the EEPROM of the ONA printed board is set to "invalid", the readout of the MAC address from the EEPROM is inhibited. And "invalid" is set to the flag of the EEPROM of the ONA printed board for the old ONA (FIG. 23). Therefore, it does not happen, as long as the value of the flag remains "invalid", that the MAC address A unique to the ONA printed board, which is written to the EEPROM, is read even when the ONA printed board for the old ONA is demounted from the housing A and inserted into another housing (housing B). This contrivance prevents the uniqueness of the MAC address from being affected due to an overlap of the MAC address between the housing A and the housing B.

[Patent document 1] Japanese Laid-Open Patent Publication No. H10-65702
[Patent document 2] Japanese Laid-Open Patent Publication No. 2004-13327
[Patent document 3] Japanese Laid-Open Patent Publication No. 2005-51527

The operation example of the MAC address described above is applied to the case of exchanging only the ONA printed board without exchanging the housing of the server, however, in the case of purchasing a server system including the housing and replacing the server system within the conventional housing, it is desirable in terms of an economic aspect that the ONA printed board is migrated into the new housing (housing B) and thus utilized unless any fault occurs in the ONA printed board. In this case, if the ONA printed board can successively utilize the MAC address A employed so far in the original housing (housing A), it is convenient because of having no necessity for changing the setting in the ARP table of each terminal.

The MAC address A is not, however, stored from the beginning in the hard disk of the SVP in the new housing (housing B). Further, as described above, "invalid" is set to the flag on the EEPROM of the ONA printed board which is once mounted into the original housing (housing A), and hence, if the ONA printed board once mounted into the original housing is mounted into the new housing (housing B), it does not happen the MAC address A is read from the EEPROM and stored in the hard disk of the SVP. Note that the customer engineer should be assigned neither authority of deleting the MAC address on the hard disk of the SVP nor authority of changing the flag of the EEPROM of the ONA printed board in order to keep the uniqueness of the MAC address and is therefore disabled from manually changing the flag.

Moreover, on the EEPROM of the ONA printed board mounted into the original housing (housing A) in place of the old ONA printed board, the unique MAC address B different from the MAC address A used so far in the original housing (housing A) is written. Therefore, if the board with mounting even if the value of the flag can be changed to "valid", the MAC address A can not be handed over to the new housing (housing B).

Under such circumstances, in the status quo, it is impossible to take over the MAC address, and, as a result, if the housing of the server is changed, a necessity inevitably arises for resetting the MAC address in the ARP tables of all of the terminals performing the communications with the server.

SUMMARY

According to an aspect of the invention, a MAC address management method for use in a computer system having a disk device to store a MAC address and assigns the MAC address to an open network adaptor (ONA) printed board, which has a memory retaining a MAC address and an open network adaptor, mounted into the computer system, includes: reading, when an ONA printed board is mounted into the computer system for the first time, the MAC address from the memory on the ONA printed board and storing the MAC address in the disk device and invalidating the MAC address stored in the memory; and validating, if a migration instruction is inputted, the MAC address stored in the memory of the ONA printed board mounted in the computer system.

According to another aspect of the invention, a MAC address for use in a computer system having a disk device to store a MAC address and assigns the MAC address to an open network adaptor (ONA) printed board, which has a memory retaining a MAC address and an open network adaptor, mounted into the computer system, includes: reading, when an ONA printed board is mounted into the computer system for the first time, the MAC address from the memory on the ONA printed board and storing the MAC address in the disk device and invalidating the MAC address stored in the memory; invalidating, when another ONA printed board is mounted into the computer system after an exchange instruction has been inputted, the MAC address stored in the memory on the ONA printed board without storing the MAC address in the disk device; and overwriting, if a migration instruction is inputted, the MAC address stored in the disk device to the memory on the ONA printed board mounted in the computer system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the present invention will hereinafter be described with reference to the drawings.

[Hardware Configuration]

Figure 1:
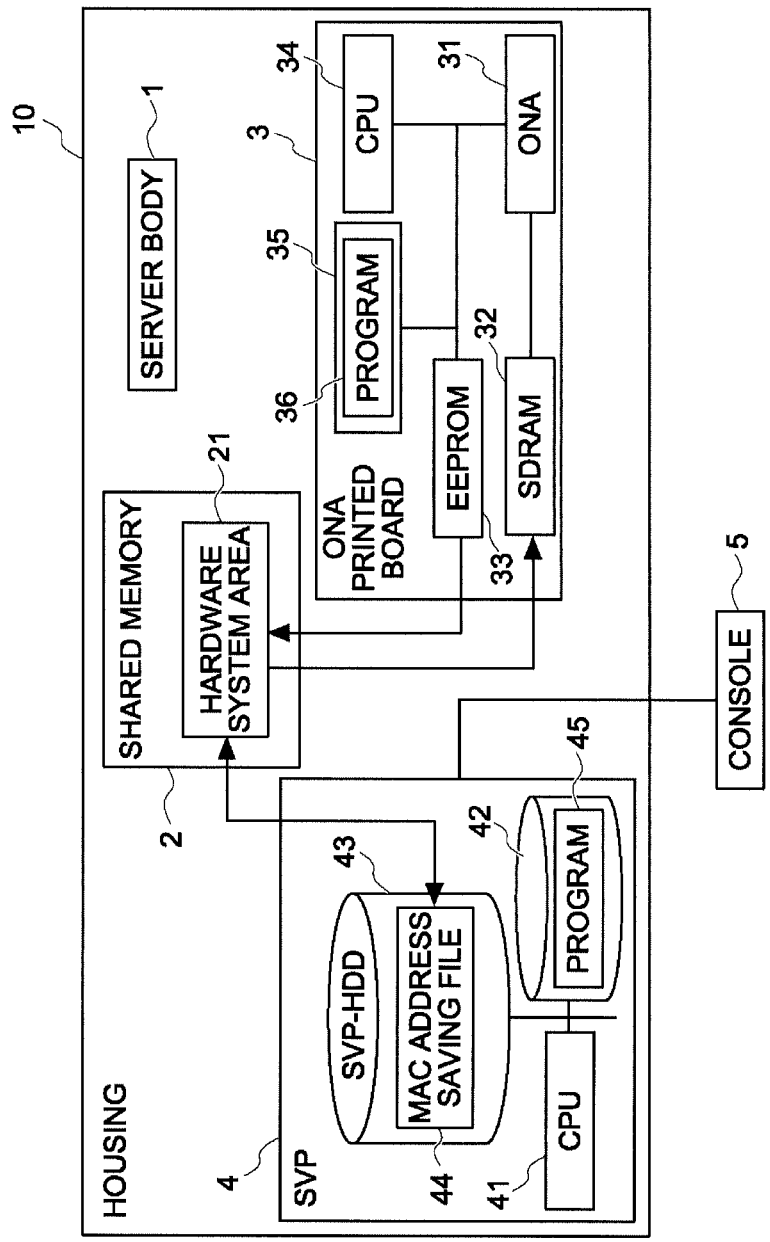
FIG. 1 is a block diagram illustrating an outline of a configuration of a server apparatus.

FIG. 1 is a block diagram illustrating an outline of a configuration related to a MAC address in a server apparatus. As illustrated in FIG. 1, the server apparatus based on this embodiment is constructed of, as main parts, a housing 10 including internally built-up components, i.e., a server body 1 and a shared memory 2, an ONA (Open Network Adaptor) printed board 3 and an SVP 4 that are individually inserted in channel slots (their illustrations are omitted) formed in a side surface of this housing 10.

On a part of the shared memory 2 among these components, a hardware system area 21 used for translating the MAC address between the ONA printed board 3 and the SVP 4 is reserved.

Further, the SVP 4 is configured by mounting, on the printed board, a CPU 41 for executing processes; a storage medium 42 stored with a program 45 read and executed by the CPU 41 to thereby make the CPU 41 carry out a variety of processes for monitoring and diagnosing the server 1 and managing the MAC address with respect to the ONA printed board 3; and an SVP-HDD (Hard Disk Drive) 43 stored with a MAC address saving file 44 which will be described later on.

Note that a console 5 installed outside the housing 10 of the server apparatus is connected to the SVP 4, and a customer engineer is capable of inputting a variety of commands to the SVP 4 by operating the console 5. The connection between the SVP 4 and the console 5 may be established directly with a variety of interfaces and may also be established through the ONA printed board 3 and a network such as unillustrated Ethernet (registered trademark).

On the ONA printed board 3, mounted are an ONA body 31; an SDRAM 32 stored with the MAC address used by the ONA body 31 to perform the communications; an EEPROM 33 stored with the unique MAC address allocated to the ONA printed board 3 when the ONA printed board 3 is shipped from the factory and a flag to which a value "valid" representing that the MAC address can be read or a value "invalid" representing that the MAC address can not be read is set; a CPU 34 which executes a variety of processes for controlling transfer and reception of the MAC address among the SDRAM 32, the EEPROM 33 and the shared memory 2; and a ROM 35 stored with a program 36 read by the CPU 34 to execute the processes described.

[Processing]

The variety of processes executed by the CPU 41 of the SVP 4 according to the program 45 and the variety of processes executed by the CPU 34 of the ONA printed board 3 according to the program 36, will hereinafter be described on a scene-by-scene basis.

[New Mounting Process]

Figure 3:
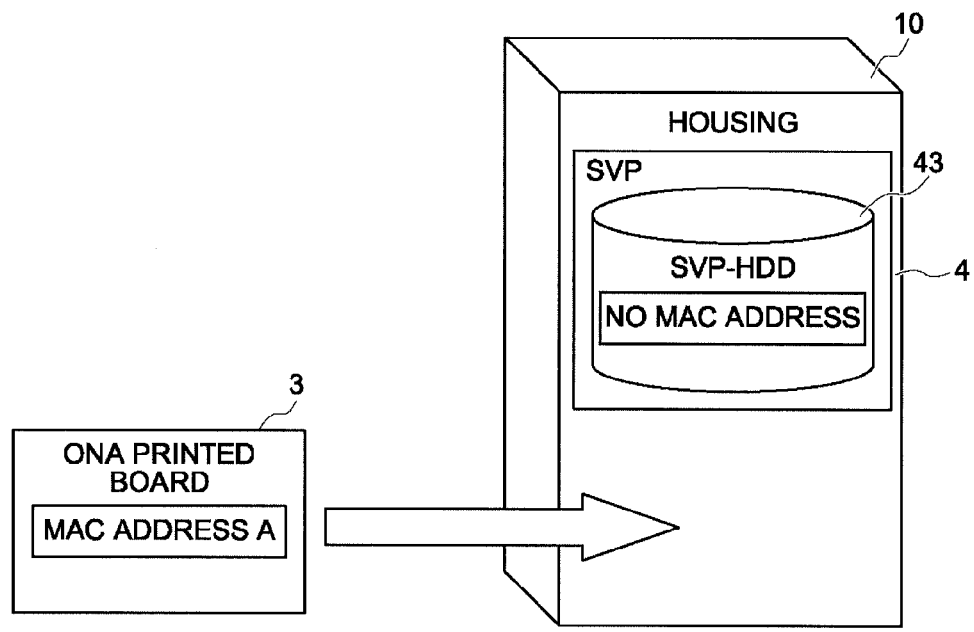
FIG. 3 is an explanatory diagram of new mounting.
Figure 4:
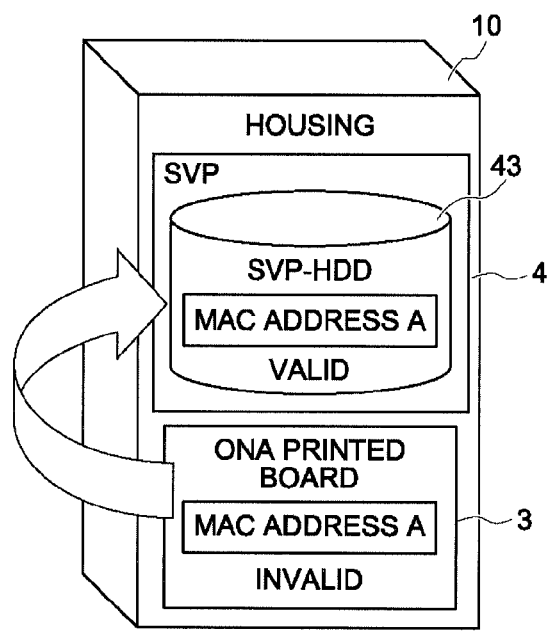
FIG. 4 is an explanatory diagram of the new mounting.
Figure 5:
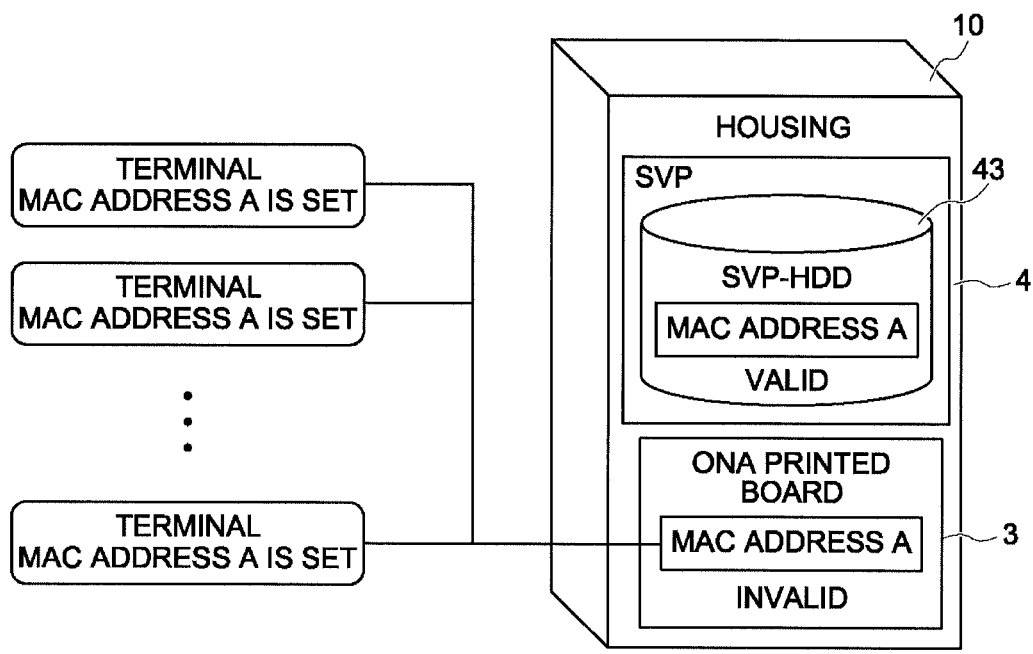
FIG. 5 is an explanatory diagram of the new mounting.

To start with, in a scene of first mounting the ONA printed board 3 into the housing 10 (housing A), a process executed by the CPU 41 of the SVP 4 according to the program 45 and a process executed by the CPU 34 of the ONA printed board 3 according to the program 36, will hereinafter be described with reference to a flowchart of FIG. 2 and schematic diagrams of FIGS. 3 through 5. FIG. 3 illustrates a status of how the ONA printed board 3 is mounted at first into the housing 10. FIG. 4 illustrates a status in which a MAC address A stored in the EEPROM 33 of the ONA printed board 3 is copied to the hard disk 43, while the original MAC address A stored in the EEPROM 33 is invalidated. FIG. 5 illustrates a status in which the MAC address A is set in each terminal. Note that the housing 10 is referred to as a "housing A" in FIG. 2.

In this scene, the ONA printed board 3 is not yet mounted into the housing 10 (housing A), and hence any MAC address is not stored in the hard disk 43 of the SVP 4.

The customer engineer mounts, into this housing A, the ONA printed board 3 in which the EEPROM 33 retains the MAC address A defined as the unique MAC address and the value of the flag in the EEPROM 33 is set to "valid" (FIG. 3) (S001).

The CPU 34 on the ONA printed board 3 detects that the ONA printed board 3 is mounted into the housing A (S021) and notifies the SVP 4 of this purport.

The CPU 41 of the SVP 4 receiving the notification from the ONA printed board 3 starts a mount process (S011). The CPU 41 then reads, in S012, the MAC address which is unique to the ONA printed board 3 in the EEPROM 33 of the ONA printed board 3. In next step S013, CPU 41 saves the readout MAC address A in the MAC address saving file 44 in the hard disk on the SVP 4 (FIG. 4), and thereafter completes the mount process.

On the other hand, the CPU 34 on the ONA printed board 3 sets "invalid" to the flag on the EEPROM 33 in S022 to invalidate the MAC address stored in the EEPROM 33 (FIG. 4), and thereafter completes the mounting process.

Hereafter, when a user of the server switches on a main power source of the server, an initial setting process is executed. When the initial setting process is executed, the MAC address A saved in the hard disk 43 of the SVP 4 is copied to the SDRAM 32 on the ONA printed board 3 and used by the ONA body 31 for transmitting and receiving the data.

Corresponding to this scheme, in each terminal performing the communication with the server apparatus 1, the customer engineer sets the MAC address A defined as the MAC address used by the ONA body 31 and an IP address of the server apparatus 1 in the way of being associated with each other in an ARP table for ARP (Address Resolution Protocol) (FIG. 5).

Based on what has been discussed above, the communications can be performed between the ONA body 31 of the server apparatus 1 and each terminal by use of the MAC address A.

[Migration Process of ONA Printed Board after being Newly Mounted]

Figure 6:
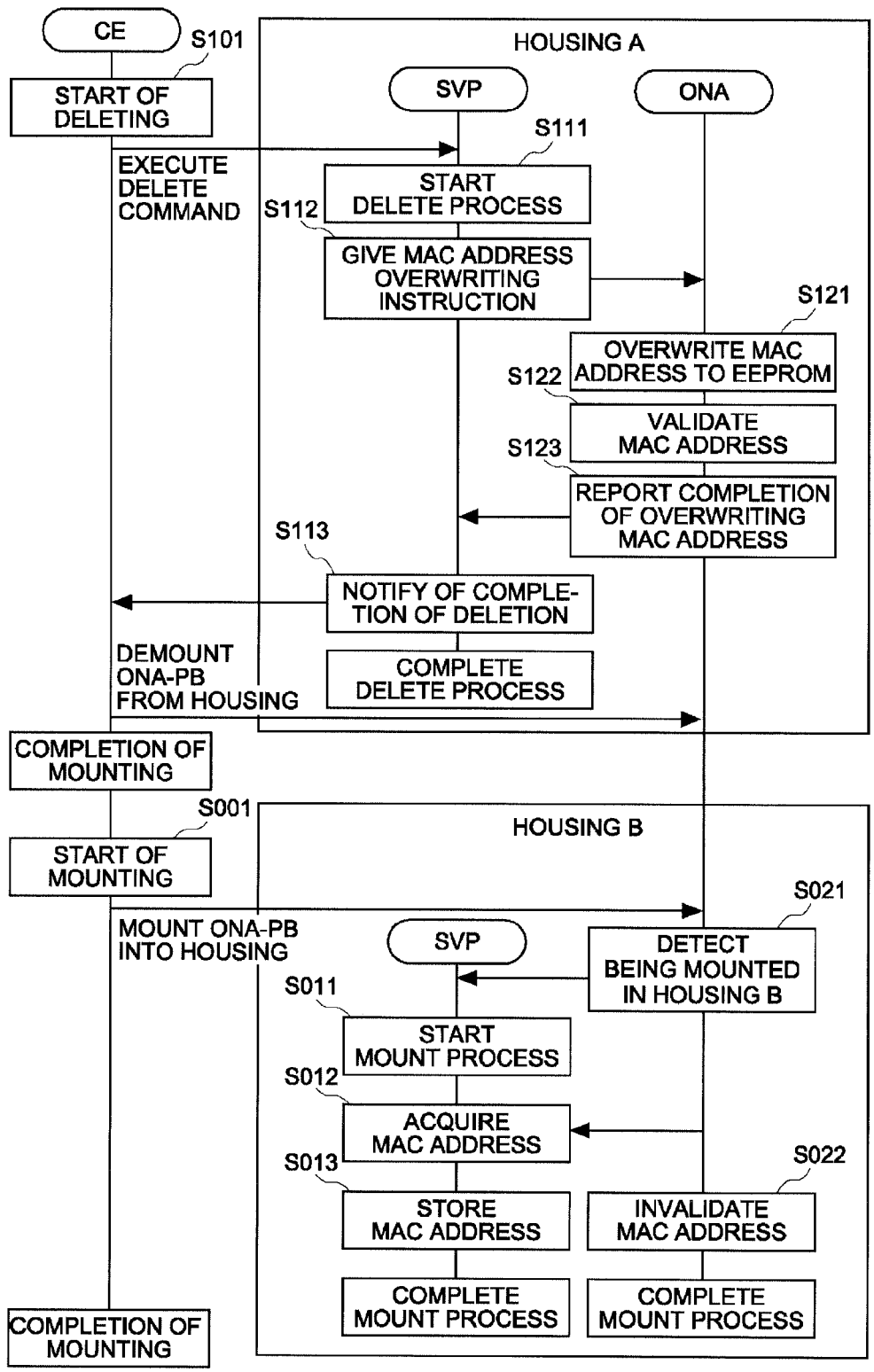
FIG. 6 is a flowchart illustrating a migration process.
Figure 7:
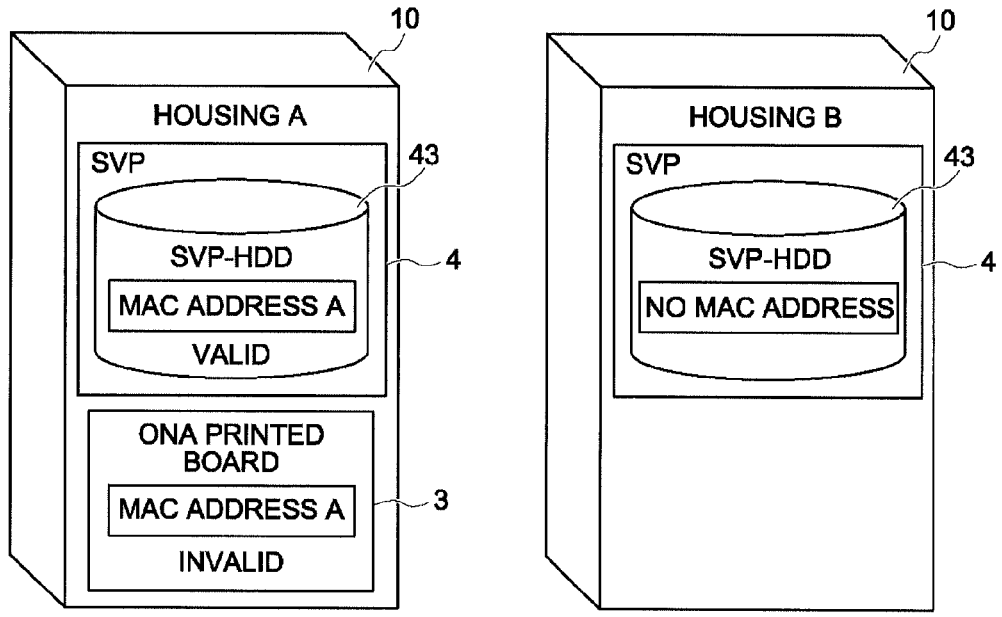
FIG. 7 is an explanatory diagram for migrating the ONA printed board.
Figure 8:
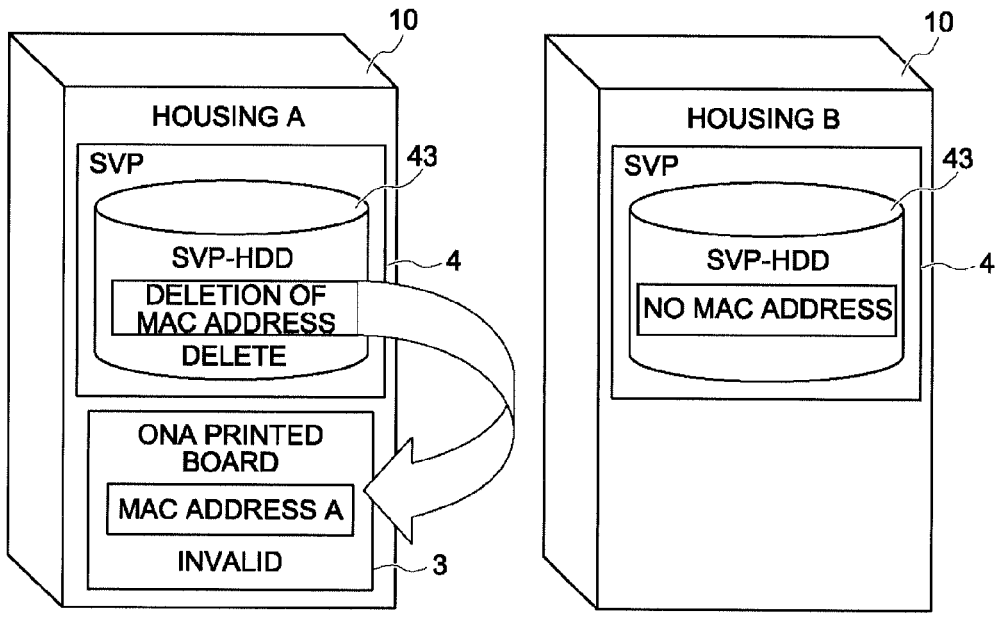
FIG. 8 is an explanatory diagram for migrating the ONA printed board.
Figure 9:
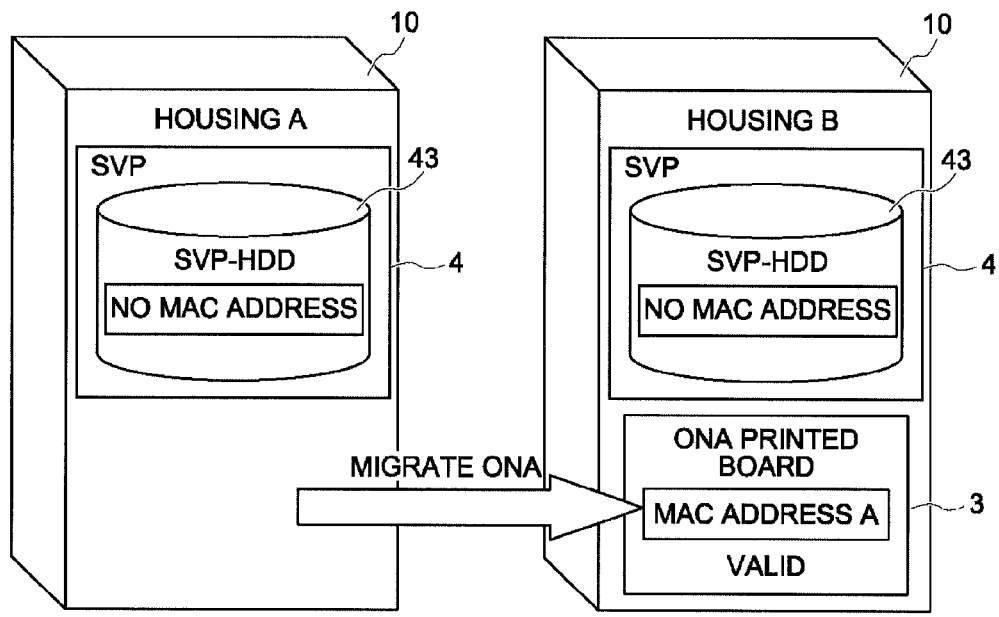
FIG. 9 is an explanatory diagram for migrating the ONA printed board.
Figure 10:
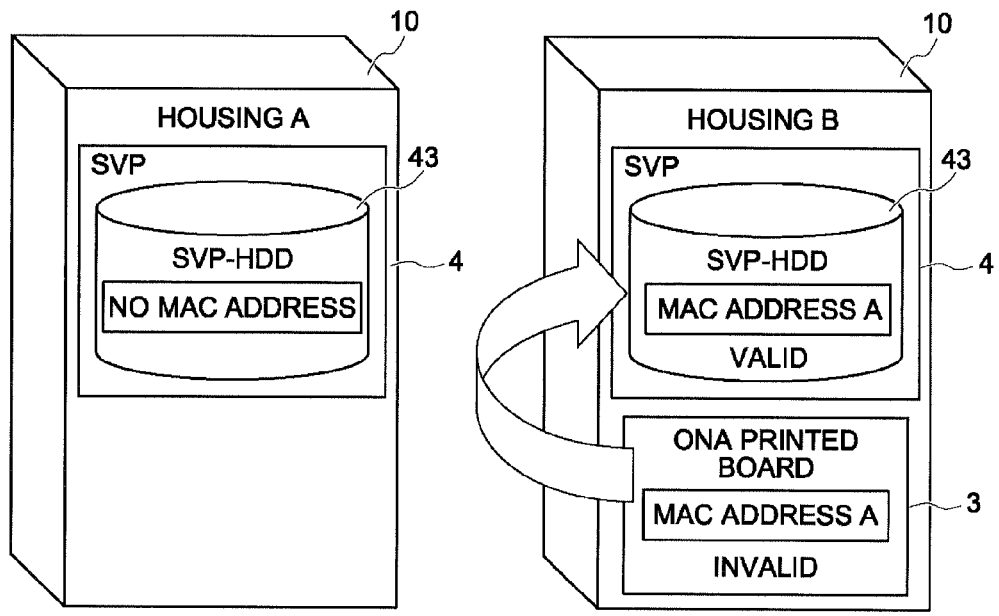
FIG. 10 is an explanatory diagram for migrating the ONA printed board.

Next, in a scene of migrating the ONA printed board 3 mounted for the first time in the housing A into another housing B, a process executed by the CPU 41 of the SVP 4 according to the program 45 and the process executed by the CPU 34 of the ONA printed board 3 according to the program 36, will hereinafter be described based on a flowchart of FIG. 6 and conceptual diagrams of FIGS. 7 through 10. FIG. 7 illustrates a status in which the ONA printed board 3 is mounted into the housing A as a result of the new mounting process described above, the MAC address A stored in the EEPROM 33 thereof is copied to the hard disk 43 of the SVP 4 while the original MAC address A stored in the EEPROM 33 is invalidated. FIG. 8 illustrates a status in which the MAC address A stored in the EEPROM 33 on the ONA printed board 3 mounted into the housing A is validated while the MAC address A copied to the hard disk 43 of the SVP 4 is deleted. FIG. 9 illustrates a status in which the ONA printed board 3 is demounted from the housing A and is then mounted into the housing B. FIG. 10 illustrates a status in which the MAC address A stored in the EEPROM 33 of the ONA printed board 3 is copied to the hard disk 43 of the SVP 4 of the housing B while the original MAC address A stored in the EEPROM 33 is invalidated.

In this scene, the customer engineer inputs through the console 5 a delete command as a migration instruction to the SVP 4 of the housing A into which the ONA printed board 3 is mounted for the first time (S101). For example, the delete command is inputted to the SVP 4 by operating a "delete" button from within a plurality of selection buttons displayed on the display of the console 5.

The CPU 41 of the SVP 4 receiving the delete command starts a delete process at S111. In the next step S112, the CPU 41 notifies the ONA printed board 3 of an instruction of overwriting the MAC address saved in the MAC address saving file 44 of the hard disk 43 to the EEPROM 33, and then deletes the MAC address of the ONA printed board 3 from the hard disk 43 (FIG. 8). Note that as illustrated in FIG. 7, if the demount target board is the ONA printed board 3 which is mounted for the first time into the housing A and the EEPROM 33 of which is stored with the MAC address A, the overwrite/delete target MAC address is "MAC address A".

The CPU 34 notified of the overwrite instruction at S121 overwrites the MAC address of the EEPROM 33 with the overwrite instruction target MAC address A (FIG. 8). In the case of executing S121 in the scene illustrated in FIG. 7, however, there is no change in MAC address stored in the EEPROM 33 before and after overwriting the MAC address.

In the next S122, the CPU 34 of the ONA printed board 3 sets "valid" to the flag within the EEPROM 33, thereby validating the MAC address A stored in the EEPROM 33 (FIG. 8).

In the next step S123, the CPU 34 of the ONA printed board 3 reports completion of having overwritten the MAC address to the SVP 4.

The CPU 41 of the SVP 4 receiving the completion-of-overwriting report from the ONA printed board 3 notifies the console 5 of completion-of-deletion in S113 and, after getting this purport displayed on the unillustrated display of the console 5, finishes the delete process.

After the processes described above are done, the customer engineer who visually recognizes the completion-of-deletion message displayed on the display of the console 5, can properly demount the ONA printed board 3 from the housing A (FIG. 9).

Thereafter, when the customer engineer mounts ONA printed board 3 of the same type into another housing B (S001) (FIG. 9), the mounting process is executed in the same way as in the case of FIG. 1 illustrated above. Incidentally, this mounting process is executed based on the same program as the program for carrying out the new mounting process discussed above, and hence the same processing steps as those in FIG. 2 are marked with the same step numbers. Namely, the CPU 34 of the ONA printed board 3 detects that the ONA printed board 3 is mounted into the housing B (S021) and notifies the SVP 4 of the mounting into the housing B.

The CPU 41 of the SVP 4 receiving this notification starts the mounting process (S011), then reads the MAC address A written to the EEPROM 33 on the ONA printed board 3 in S012. After saving the readout MAC address in the MAC address saving file 44 within the hard disk 43 on the SVP 4 in next step S013 (FIG. 10), CPU 41 completes the mount process.

On the other hand, the CPU 34 of the ONA printed board 3 sets "invalid" to the flag of the EEPROM 33 in S022 and, after invalidating the MAC address stored in the EEPROM 33 (FIG. 10), completes the mounting process.

Further, the customer engineer disconnects from the network the original housing A from which the ONA printed board 3 has been demounted, and connects the new housing B into which the same ONA printed board 3 is migrated to the network.

Hereafter, in the ONA initial setting process, the MAC address A stored in the hard disk 43 of the SVP 4 is copied to the SDRAM 32 of the ONA printed board 3 and is used by the ONA body 31 to transmit and the receive the data.

Accordingly, the communications can be performed between the ONA body 31 of the server and each terminal without requiring any change in setting of the ARP table of each terminal performing the communications with the server.

[Exchange Process of ONA Printed Board]

Figure 14:
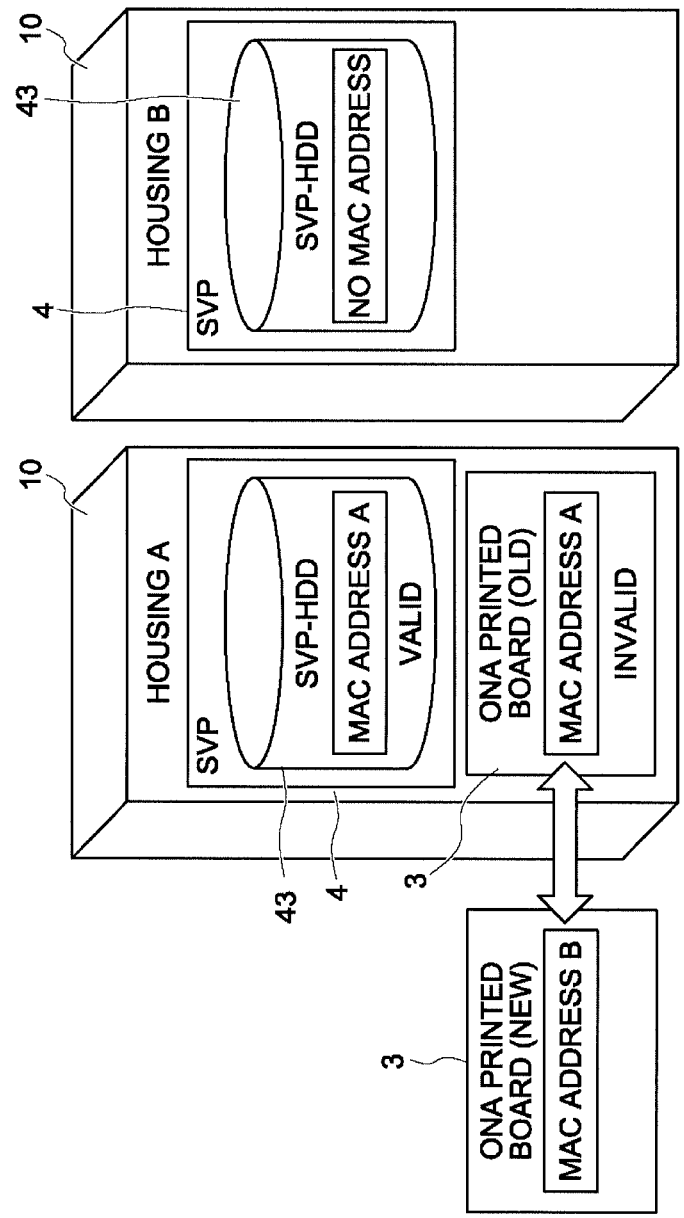
FIG. 14 is an explanatory diagram for exchanging the ONA printed board.
Figure 15:
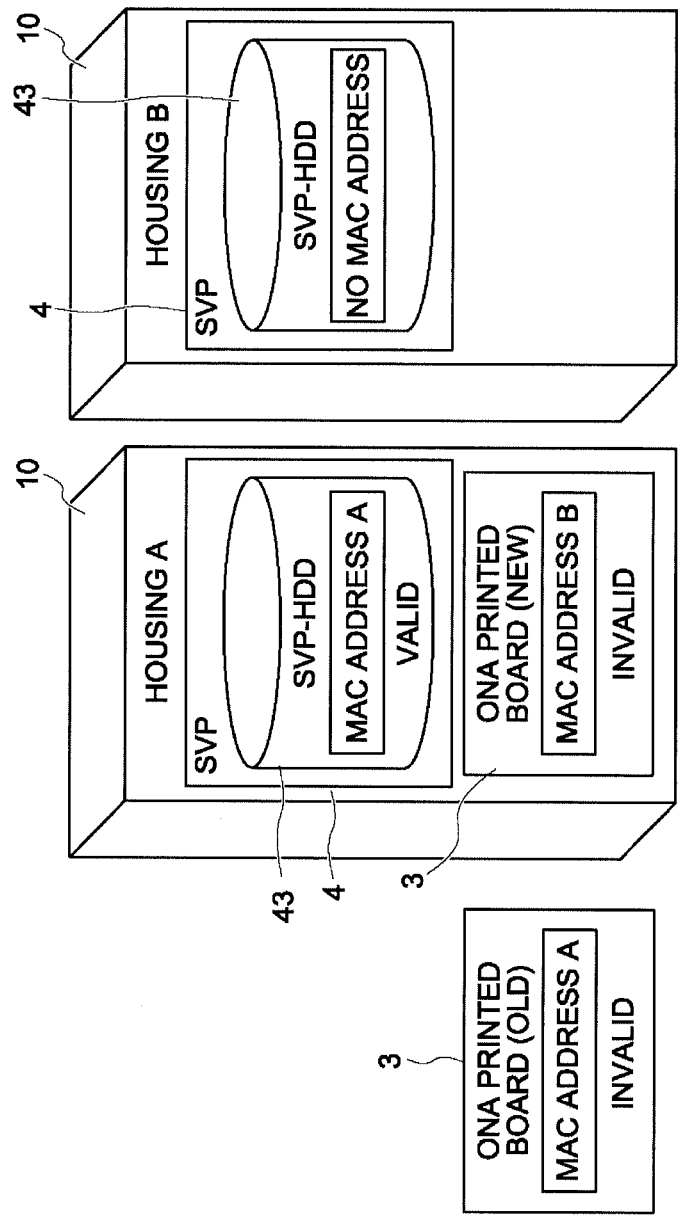
FIG. 15 is an explanatory diagram for exchanging the ONA printed board.

Next, in a scene of exchanging the ONA printed board 3 that has already been mounted into the housing 10 (which will hereinafter be called the "old ONA") with another ONA printed board 3 (which is hereinafter be called the "new ONA"), the process executed by the CPU 41 of the SVP 4 according to the program 45 and the process executed by the CPUs 34 of the new and old ONA printed boards 3 according to the program 36, will be described based on flowcharts of FIGS. 11 and 12 and conceptual diagrams of FIGS. 14 and 15. FIG. 14 illustrates a status in which the old ONA printed board 3 is mounted into the housing A as a result of the new mounting process, the MAC address stored in the EEPROM 33 is copied to the hard disk 43 of the SVP 4 while the MAC address stored in the EEPROM 33 is invalidated. FIG. 15 illustrates a status in which the old ONA printed board 3 is demounted from the housing A while the new ONA printed board 3 is mounted, and the MAC address B stored in the EEPROM 33 is invalidated.

Figure 2:
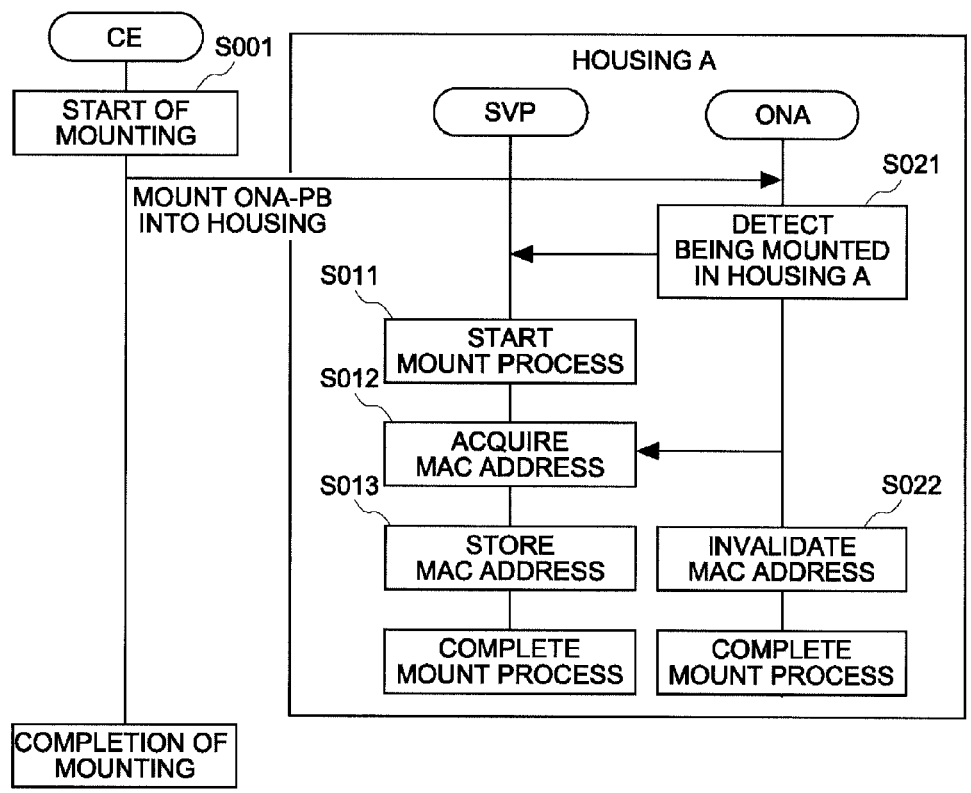
FIG. 2 is a flowchart illustrating a new mount process.
Figure 11:
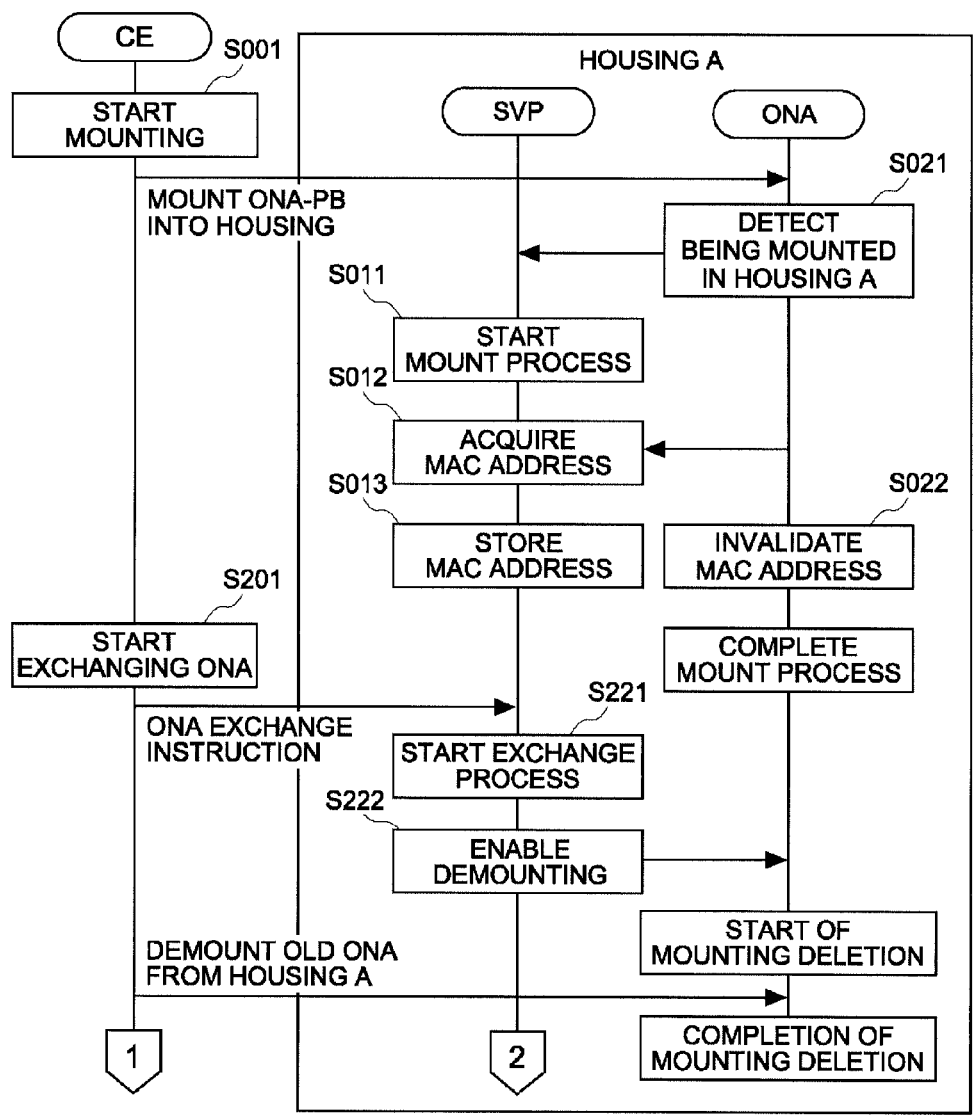
FIG. 11 is a flowchart illustrating the migration process after exchanging the ONA printed board.
Figure 12:
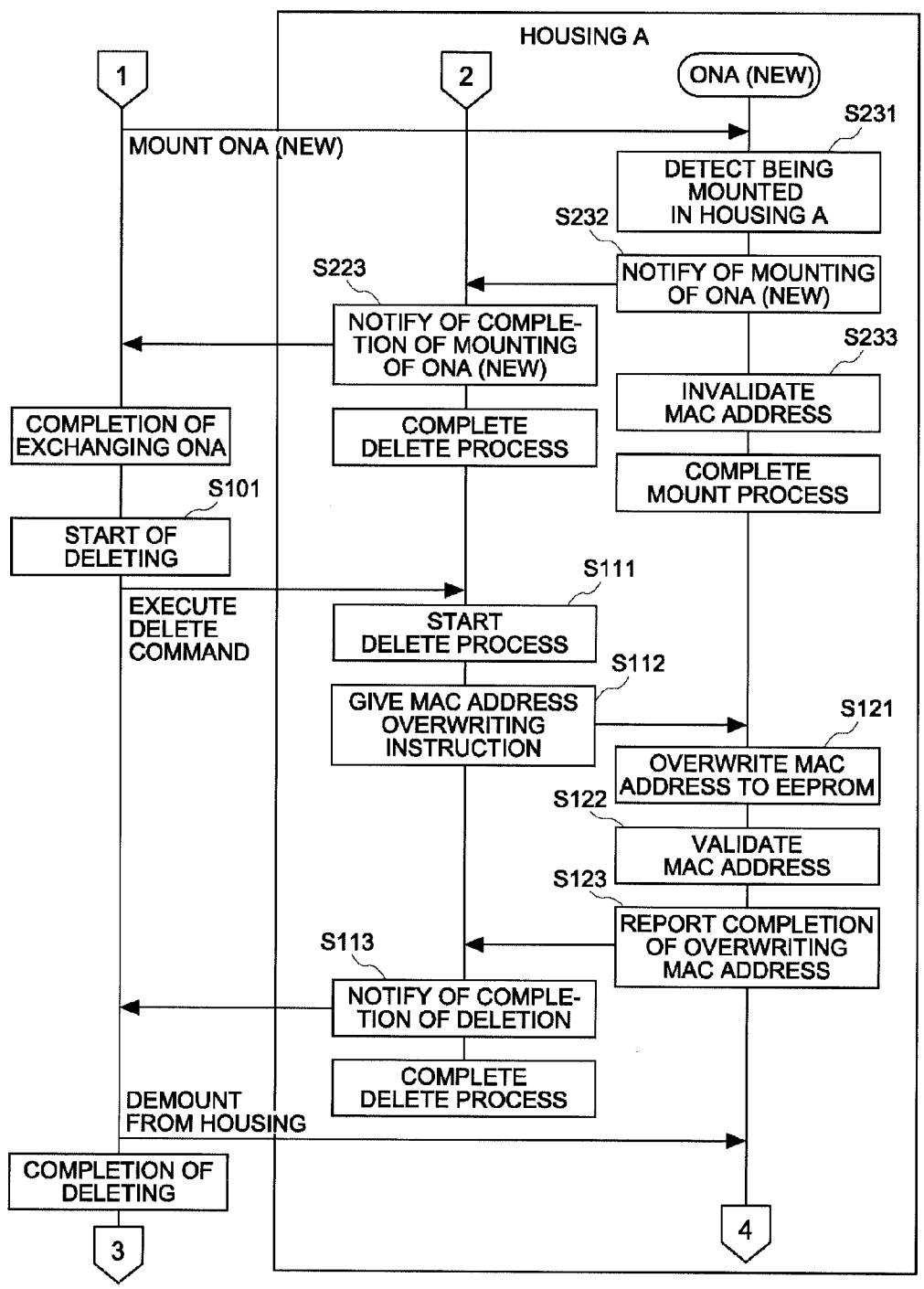
FIG. 12 is a flowchart illustrating the migration process after exchanging the ONA printed board.

The processes in S001, S021, S011, S012, S013 and S022 in FIG. 11 are executed according to the same program as the program for carrying out the new mounting process described above and are therefore given the same step numbers as those in FIG. 2. For exchanging the old ONA printed board 3 mounted for the first time into the housing A with the new ONA printed board 3 through the mounting process described above, the customer engineer inputs an ONA exchange instruction to the SVP 4 of the housing A via the console 5 (S201). For example, the ONA exchange instruction is inputted to the SVP 4 by operating an "exchange" button from within the plurality of selection buttons displayed on the display of the console 5. Next, when the customer engineer inputs the exchange instruction to the SVP 4 from the console 5, the CPU 41 of the SVP 4 starts the exchange process (S221) and enables the old ONA 3 to be demounted in S222.

Then, the customer engineer takes the old ONA 3 out of the housing A.

Subsequently, the customer engineer mounts into the server apparatus 1 the new ONA 3, in which the unique MAC address to the new ONA 3 is written to its EEPROM 33 (FIG. 14). Then, the CPU 34 of the new ONA 3 detects that the new ONA 3 is mounted into the housing A (S231), and notifies the SVP 4 that the new ONA 3 is mounted in S232. Subsequently, in S233, the CPU 34 of the new ONA 3 sets "invalid" to the flag in the EEPROM 33 to invalidate the unique MAC address B of the new ONA 3 (FIG. 15), and thereafter completes the mounting process. In this case, the MAC address A stored in the hard disk 43 of the SVP 4 is not rewritten.

On the other hand, the CPU 41 of the SVP 4 notified of the mounting of the new ONA 3 notifies the console 5 in S223 that the mounting of the new ONA 3 is completed, then gets this purport displayed on the unillustrated display of the console 5, and thereafter completes the exchange process.

[Migration Process of Post-Exchange ONA Printed Board]

Figure 13:
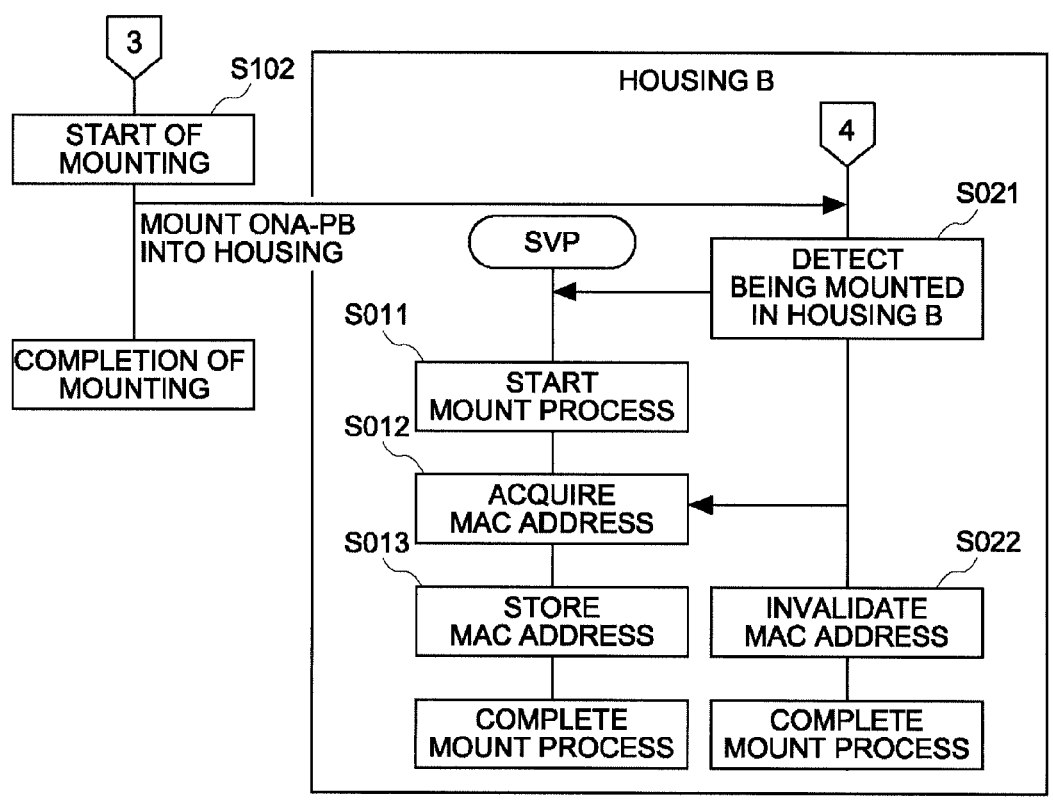
FIG. 13 is a flowchart illustrating the migration process after exchanging the ONA printed board.
Figure 16:
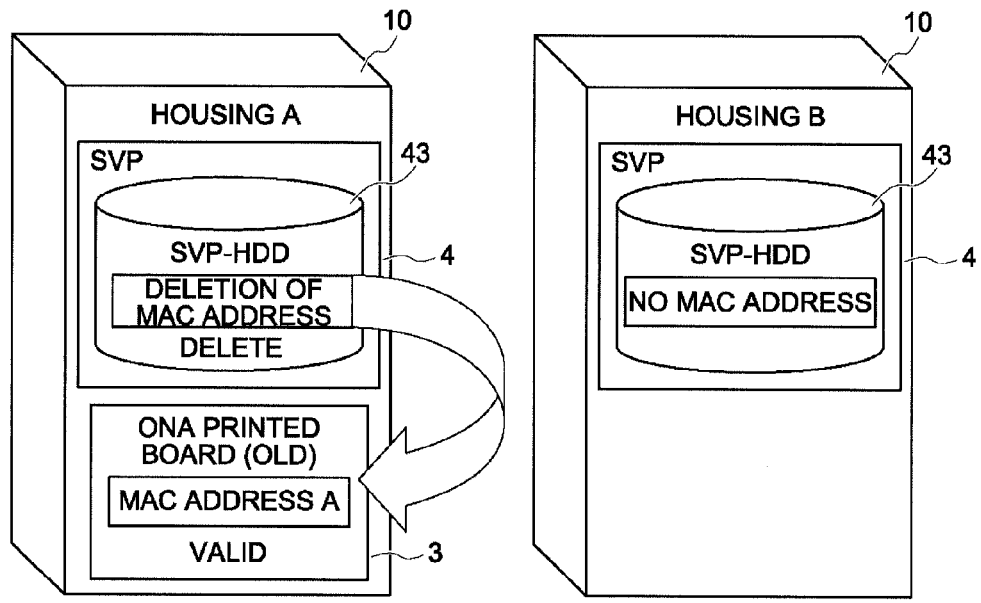
FIG. 16 is an explanatory diagram for exchanging the ONA printed board.
Figure 17:
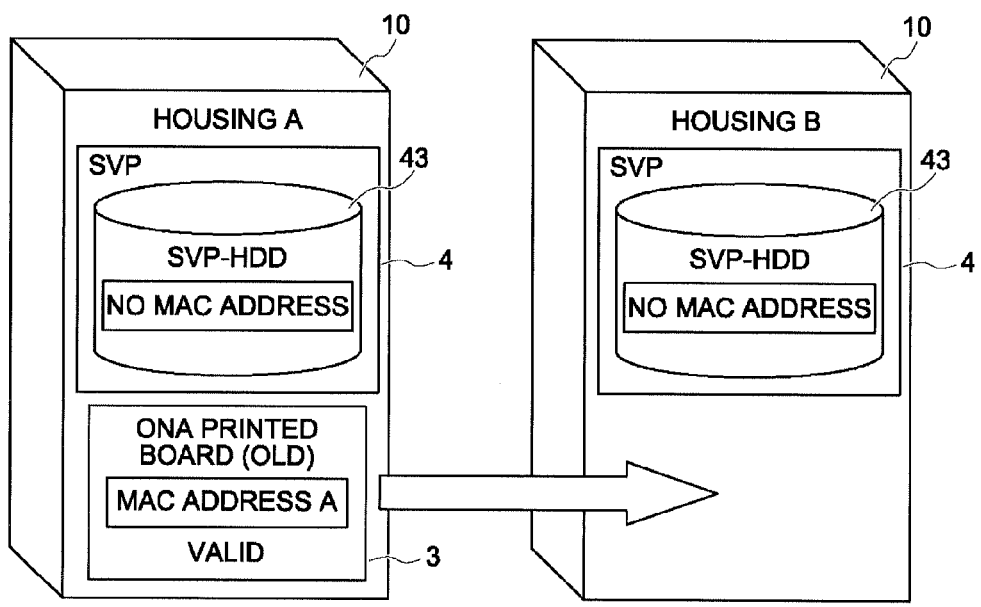
FIG. 17 is an explanatory diagram for migrating the ONA printed board.
Figure 18:
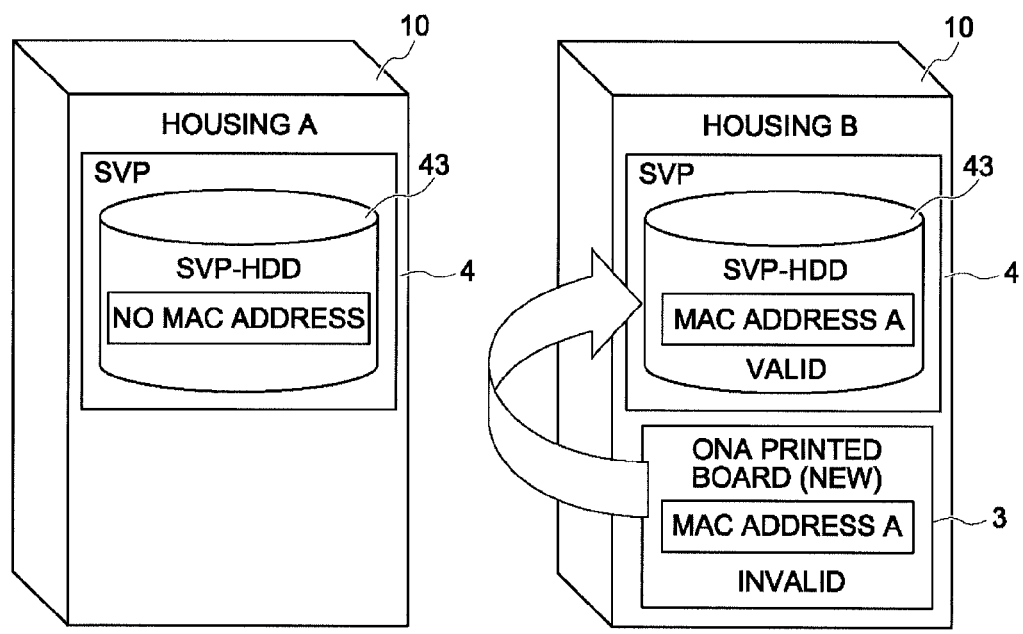
FIG. 18 is an explanatory diagram for migrating the ONA printed board.
Figure 19:
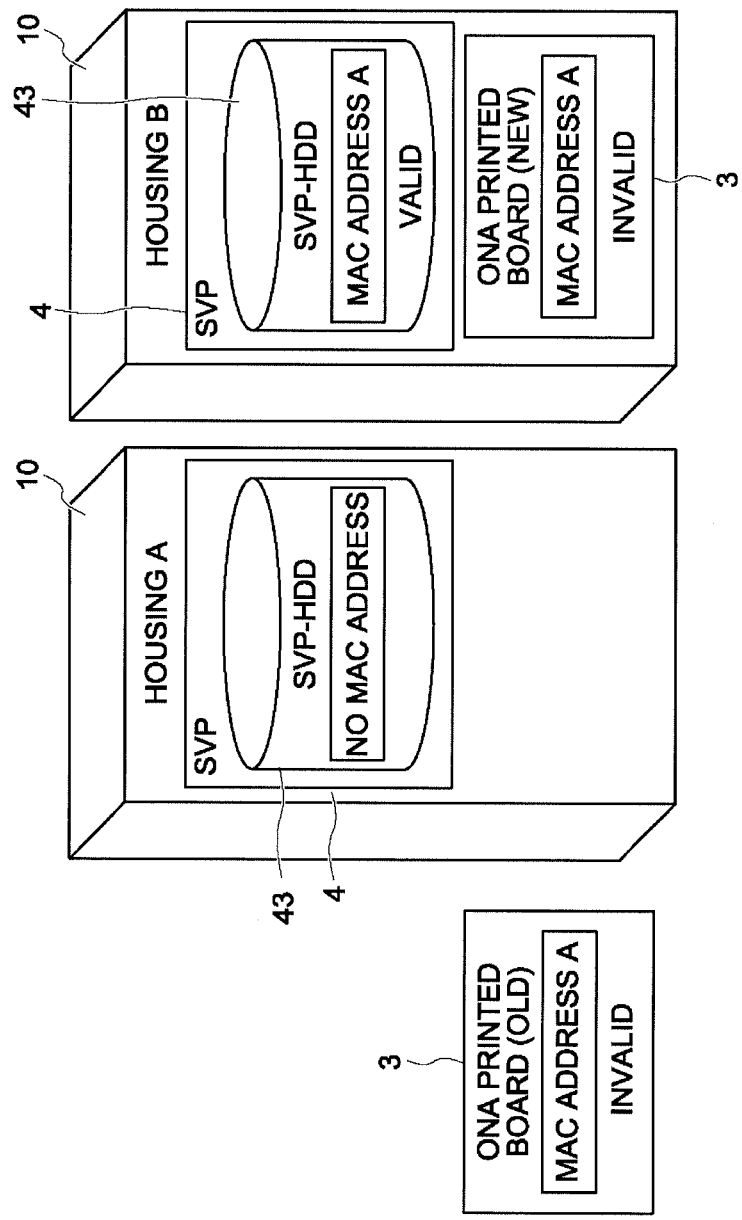
FIG. 19 is an explanatory diagram for migrating the ONA printed board.
Figure 20:
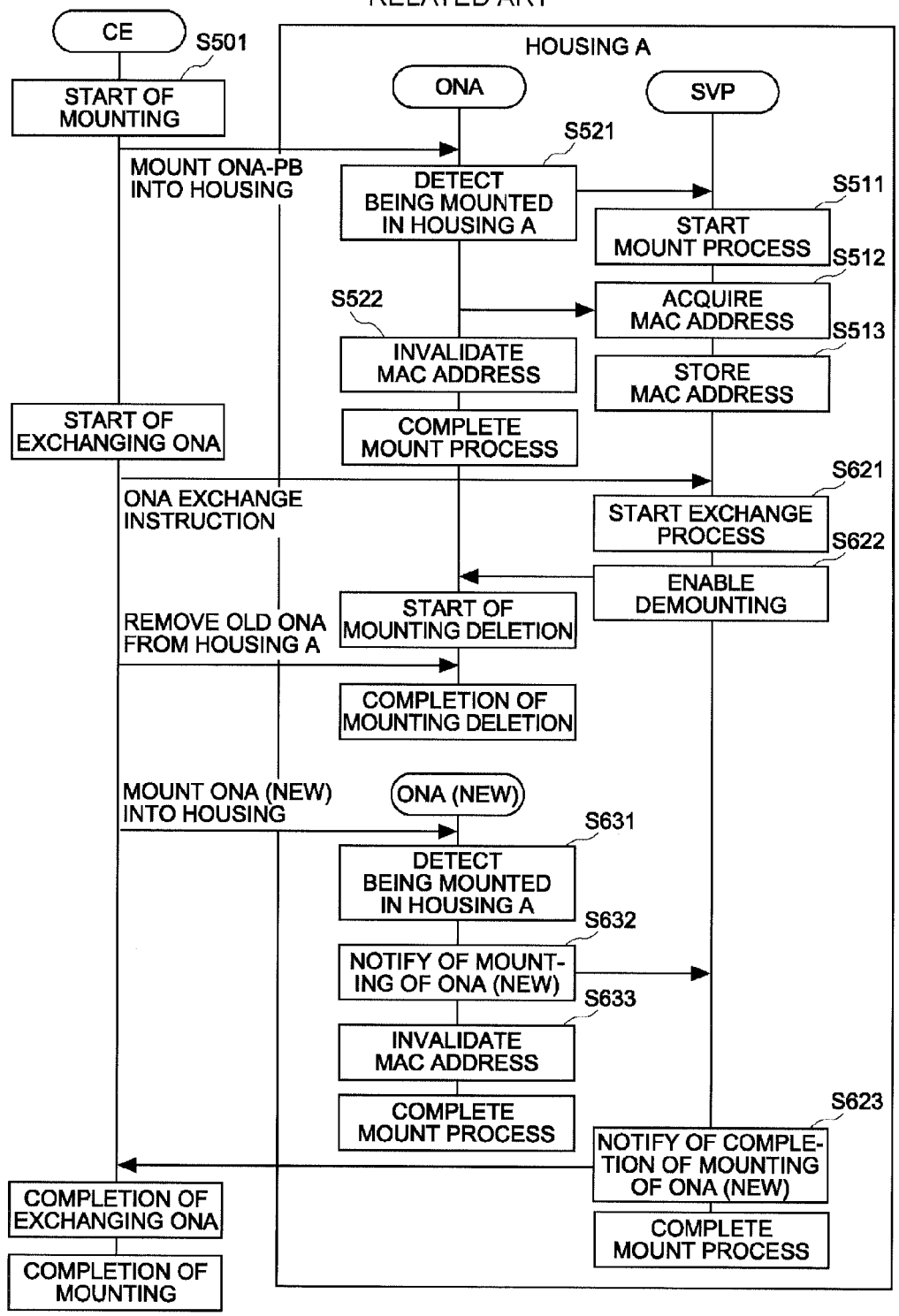
FIG. 20 is a flowchart illustrating the ONA printed board exchange process in the related art.
Figure 21:
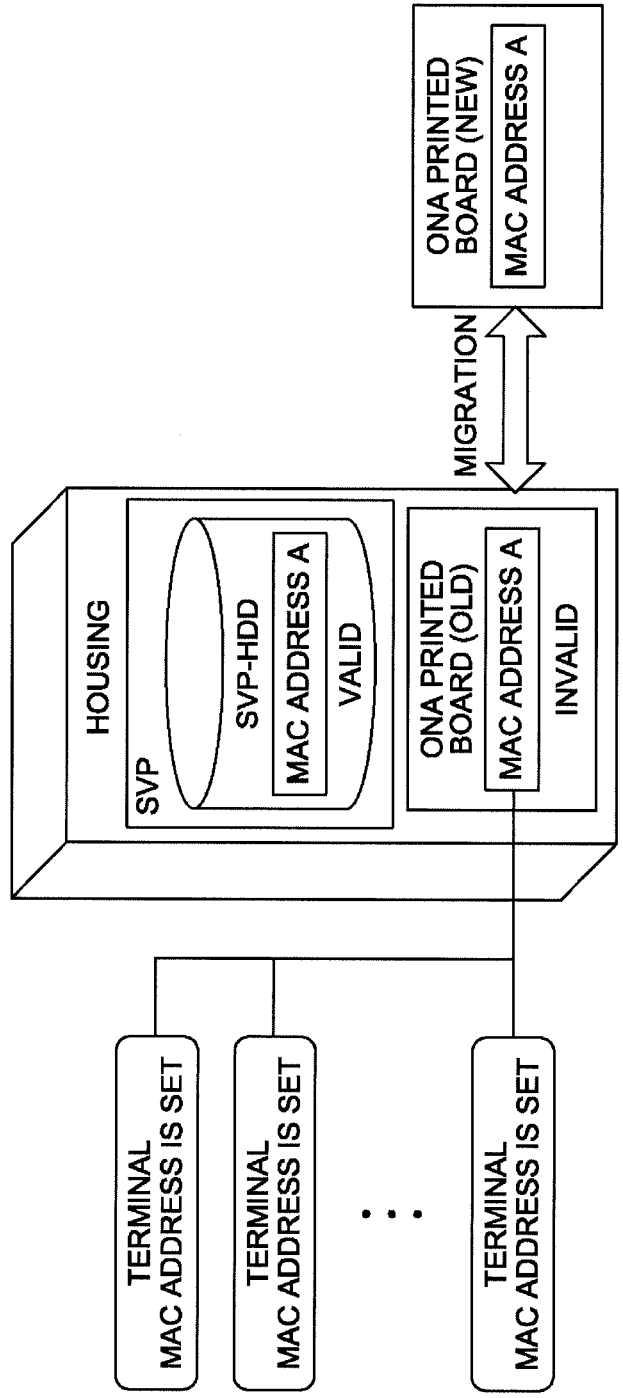
FIG. 21 is an explanatory diagram for exchanging the ONA printed board in the related art.
Figure 22:
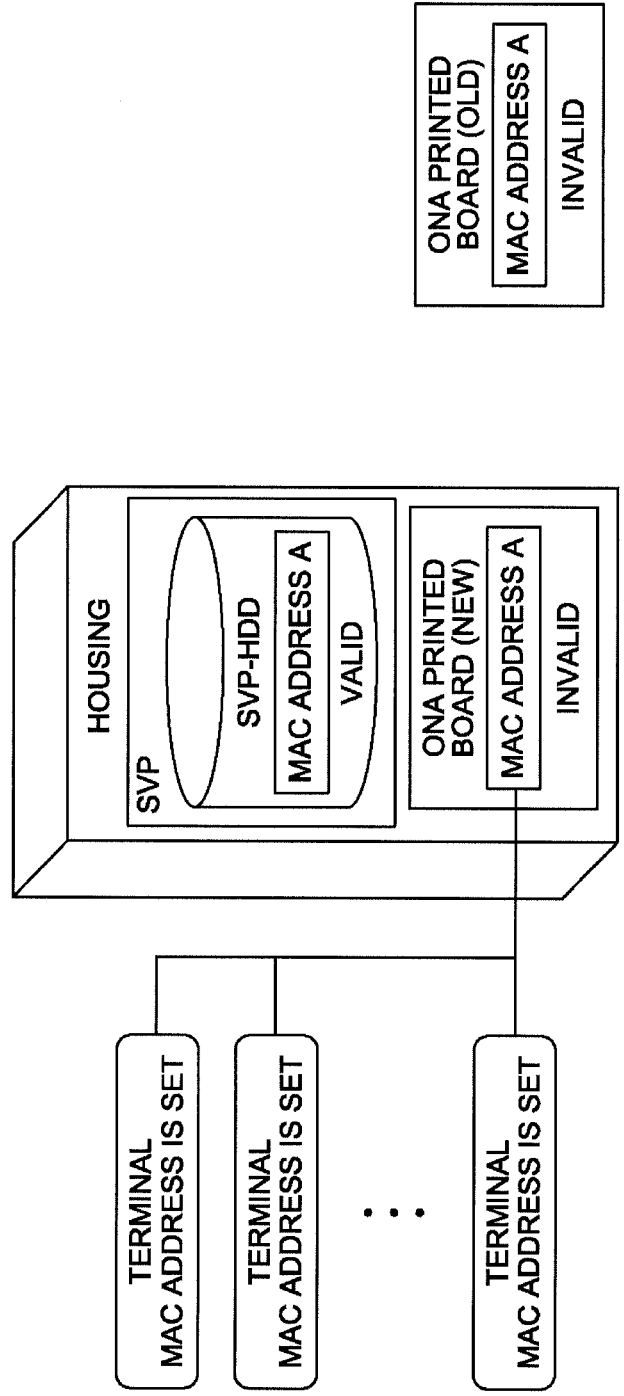
FIG. 22 is an explanatory diagram for exchanging the ONA printed board in the related art.
Figure 23:
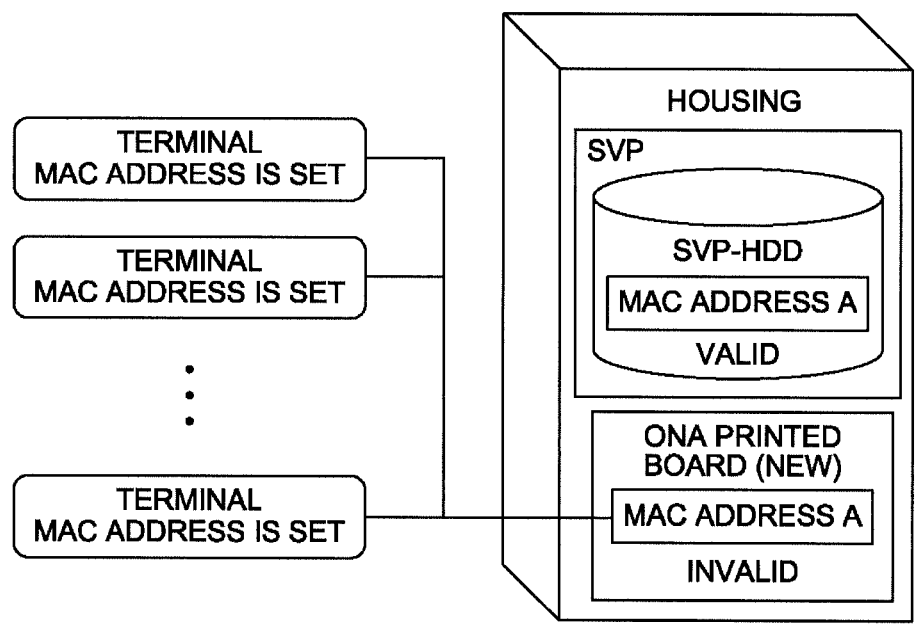
FIG. 23 is an explanatory diagram for exchanging the ONA printed board in the related art.

Next, in a scene of migrating the new ONA with which to exchange the old ONA 3 mounted for the first time into the housing A into another housing B, a process executed by the CPU 41 of the SVP 4 according to the program 45 and a process executed by the CPU 34 of the ONA printed board 3 according to the program 36 will hereinafter be described based on flowcharts of FIGS. 12 and 13 and diagrams of FIGS. 16 through 19. FIG. 16 illustrates a status in which as a result of executing the exchange process of exchanging the ONA printed board 3 after the new mounting process described above, the MAC address is overwritten to the EEPROM 33 of the new ONA 3 and thus validated from the status where the MAC address A stored in the EEPROM 33 of the old ONA 3 is copied to the hard disk 43 of the SVP 4 of the housing A and the new ONA 3 is mounted. FIG. 17 illustrates a status of demounting the new ONA printed board 3 from the housing and mounting the new board 3 into the housing B. FIG. 18 illustrates a status in which the MAC address A stored in the EEPROM 33 of the new ONA 3 is copied to the hard disk 43 of the SVP 4 of the housing B while the MAC address A itself that remains stored in the EEPROM 33 is invalidated. FIG. 19 illustrates a status in which the housings A and B and the old ONA 3 coexist. Note that the processes of the respective CPUs 34, 41 in this case are executed according to the same program as by the processes illustrated in FIG. 6, and hence the same processing steps as those in FIG. 6 are marked with the same step numbers in FIGS. 12 and 13. Due to a difference that the MAC address stored in the EEPROM 33 of the new ONA printed board 3 mounted into the housing A is a MAC address B, however, it follows that the two CPUs 34, 41 operate as below.

To begin with, the customer engineer inputs the delete command as the migration instruction via the console 5 to the SVP 4 of the housing A into which the new ONA 3 is mounted for the first time (S101).

The CPU 41 of the SVP 4 receiving the input of the delete command starts the delete process at S111. Then, in the next step S112, the CPU 41 notifies the new ONA 3 mounted in the housing A of the instruction to overwrite the MAC address A saved in the MAC address saving file 44 of the hard disk 43 at that point of time to the EEPROM 33, and then deletes the MAC address from the hard disk 43 (FIG. 16).

The CPU 34 of the ONA printed board 3 notified of this overwriting instruction overwrites the overwriting target MAC address A to the EEPROM 33 in S121. Accordingly, the unique MAC address B of the new ONA 3 is erased from the EEPROM 33 and rewritten into the MAC address A.

In the next step S122, the CPU 34 of the ONA printed board 3 sets "valid" to the flag within the EEPROM 33, thereby validating the overwritten MAC address A stored in the EEPROM 33 (FIG. 16).

In the next step S123, the new ONA 3 reports the completion of having overwritten the MAC address to the SVP 4.

The CPU 41 of the SVP 4 receiving the completion-of-overwriting report notifies the console 5 of the completion of the deletion in S113 and, after getting this purport displayed on the unillustrated display of the console 5, terminates the delete process.

After the processes described above are done, the customer engineer who visually recognizes the completion-of-deletion message displayed on the display of the console 5 can properly demount the new ONA 3 from the housing A (FIG. 17).

Thereafter, when the customer engineer mounts the new ONA printed board 3 demounted from the housing A into another housing B (S102, FIG. 17), in the same way as in the case of FIG. 1 illustrated above, the mounting process is executed. Namely, the CPU 34 of the new ONA 3 detects that the new ONA 3 is mounted (S021) and notifies the SVP 4 of this purport.

The CPU 41 of the SVP 4 receiving this notification starts the mounting process (S011), then reads the MAC address A written to the EEPROM 33 of the new ONA 3 in S012 and, after saving the readout MAC address A in the MAC address saving file 44 within the hard disk 43 of the SVP 4 in the next step S013 (FIG. 18), finishes the mounting process.

On the other hand, the CPU 34 of the new ONA 3 sets "invalid" to the flag of the EEPROM 33 in S022 to invalidate the MAC address A stored in the EEPROM 33 (FIG. 18), and thereafter completes the mounting process.

Moreover, the customer engineer disconnects, from the network, the original housing A from which the new ONA 3 is demounted and connects the new housing B into which the new ONA printed board 3 is migrated to the network in place of the housing A.

Hereafter, when the user of the server switches on the main power source of the server, the initial setting process is executed, and the MAC address A stored in the hard disk 43 of the SVP 4 is copied to the SDRAM 32 of the new ONA 3 and is used for the ONA body 31 to transmit and receive the data.

Accordingly, the communications can be performed between the ONA body 31 of the server apparatus 1 and each terminal without requiring any change in setting of the ARP table of each terminal performing the communications with the server.

Note that in this case, the old ONA 3 to which originally the MAC address A is allocated as the unique MAC address, separately exists while the MAC address A remains stored in the EEPROM 33. However, since "invalid" is set to the flag of the EEPROM 33 of the old ONA 3, the MAC address A stored in the EEPROM 33 of the old ONA 3 is invalid, and hence the uniqueness of the MAC address used in the hosing B is not affected.

As discussed above, according to the embodiment, when the ONA printed board 3 is mounted for the first time into the housing 10 of the server, the MAC address stored in the EEPROM 33 of the ONA printed board 3 is saved in the MAC address saving file 44 within the hard disk 43 of the SVP 4, and hereafter the saved MAC address is copied to the SDRAM 32 of the ONA printed board 3 and used for the communications. And, at least during the period for which the ONA printed board 3 is in the housing 10, "invalid" is set to the flag of the EEPROM 33 of the ONA printed board 3, and therefore the MAC address stored in the EEPROM 33 of the ONA printed board 3 is invalid and is not used directly for the communications.

Then, in the case of demounting the ONA printed board 3 from the housing 10 for the purpose of exchanging the ONA printed board 3 in the housing 10, the MAC address saved in the MAC address saving file 44 in the hard disk 43 of the SVP 4 is kept in an intact status, while "invalid" remains to be set in the flag of the EEPROM 33 of the ONA printed board 3 to be demounted. Besides, when mounting the new ONA 3 defined as the new ONA printed board 3 into the housing 10 for the exchange, the MAC address stored in the EEPROM 33 of the new ONA 3 is not read, while the MAC address saved in the MAC address saving file 44 in the hard disk 43 of the SVP 4 is copied to the SDRAM 32 of the new ONA 3 and used for the communications. Accordingly, even when exchanging the ONA printed board 3 mounted into the housing 10, the MAC address stored in the EEPROM 33 of the old ONA 3 mounted for the first time continues to be used, and hence there is no necessity for changing the setting of the ARP table of each terminal. On the other hand, the same MAC address still remains stored in the EEPROM 33 of the ONA printed board 3 mounted for the first time into the housing 10, however, "invalid" is set to the flag, and therefore the uniqueness of the MAC address is not affected by reusing the ONA printed board 3.

Further, in the case of demounting the ONA printed board 3 from the original housing 10 for the purpose of migrating the ONA printed board 3 mounted into the original housing 10 into the new housing in order to exchange the housing 10 with the new housing 10, the MAC address saved in the MAC address saving file 44 within the hard disk 43 of the SVP 4 is overwritten to the EEPROM 33 of the ONA printed board 3, and "valid" is set to the flag thereof. Accordingly, irrespective of whether the ONA printed board 3 is the board mounted for the first time into the original housing 10 or the post-exchange board, when mounting the ONA printed board 3 into the new housing 10, the MAC address used in the original housing 10, i.e., the MAC address stored in the EEPROM 33 of the ONA printed board 3 mounted for the first time into the original housing 10 is saved in the MAC address saving file 44 within the hard disk 43 of the SVP 4, and hence the MAC address saved in the hard disk 43 of the SVP 4 is successively used, whereby there is no necessity for changing the setting of the ARP table of each terminal. In the case of migrating the post-exchange ONA printed board 3 in the original housing 10 into the new housing 10, it follows that there exist the two ONA printed boards 3 of which the same MAC address is stored in the EEPROMs 33, however, "invalid" is set in the flag of the EEPROM 33 of the ONA printed board 3 mounted for the first time into the original housing 10, so that the uniqueness of the MAC address is not affected by reusing the ONA printed board 3.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A media access control (MAC), address management method for use in a computer system having a disk device to store a MAC address, and assigns the MAC address to an open network adaptor (ONA) printed board which has a memory retaining a MAC address and an open network adaptor when the ONA printed board is mounted into the computer system, the method comprising:
    reading the MAC address from the memory on the ONA printed board and storing the MAC address in the disk device and invalidating the MAC address stored in the memory, when an ONA printed board is mounted into the computer system for the first time; and
    validating the MAC address stored in the memory of the ONA printed board mounted in the computer system, when a migration instruction is inputted.

2. The MAC address management method according to claim 1, further comprising:
    invalidating the MAC address stored in the memory on the ONA printed board without storing the MAC address in the disk device, when another ONA printed board is mounted into the computer system after an exchange instruction has been inputted; and
    overwriting the MAC address stored in the disk device to the memory on the ONA printed board mounted in the computer system, when a migration instruction is inputted.

3. The MAC address management method according to claim 2, wherein the MAC address overwritten to the memory on the ONA printed board is validated when the migration instruction in inputted.

4. A media access control (MAC) address management method, in a first computer system and a second computer system, each of the first and second computer systems having a disk device to store a MAC address and assigns the MAC address to an open network adaptor (ONA) printed board, which has a memory retaining a MAC address and an open network adaptor, mounted thereinto, the method comprising:
    reading, by the first computer system, when an ONA printed board is mounted for the first time, the MAC address from the memory on the ONA printed board and storing the MAC address in the disk device and invalidating the MAC address stored in the memory;
    validating, by the first computer system, if a migration instruction is inputted, the MAC address stored in the memory on the ONA printed board; and
    reading, by the second computer system, when an ONA printed board is mounted, the MAC address from the memory on the ONA printed board and storing the MAC address in the disk device.

5. The MAC address management method according to claim 4, further comprising:
    invalidating, by the first computer system, the MAC address stored in the memory on the ONA printed board without storing the MAC address in the disk device, when another ONA printed board is mounted into the computer system after an exchange instruction has been inputted;
    overwriting, by the first computer system, the MAC address stored in the disk device to the memory on the ONA printed board, if a migration instruction is inputted; and
    reading, by the second computer system, the overwritten MAC address from the memory on the ONA printed board and storing the MAC address in the disk device, when an ONA printed board is mounted.

6. The MAC address management method according to claim 5, further comprising validating, by the first computer system, the MAC address overwritten to the memory on the ONA printed board when the migration instruction in inputted.

* * * * *

UNITED STATES PATENT AND TRADEMARK OFFICE
CERTIFICATE OF CORRECTION

PATENT NO. : 8,462,787 B2
APPLICATION NO. : 13/040554
DATED : June 11, 2013
INVENTOR(S) : Hiroki Kobayashi It is certified that error appears in the above-identified patent and that said Letters Patent is hereby corrected as shown below:

In the Claims

Column 11, Line 54, In Claim 1, delete "(MAC)," and insert -- (MAC) --, therefor.

Signed and Sealed this
Eighth Day of October, 2013

Teresa Stanek Rea
*Deputy Director of the United States Patent and Trademark Office*